(12) United States Patent
Byers et al.

(10) Patent No.: US 7,131,023 B2
(45) Date of Patent: Oct. 31, 2006

(54) PROGRAMMABLE CLOCK MANAGEMENT COMPONENT RECONFIGURATION UPON RECEIPT OF ONE OR MORE CONTROL SIGNALS TO BE ABLE TO PROCESS ONE OR MORE FREQUENCY SIGNALS

(75) Inventors: Charles Calvin Byers, Wheaton, IL (US); Richard H. Greischar, Oak Park, IL (US); Todd Keaffaber, Plano, IL (US); Andrew F. Scott, North Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 565 days.

(21) Appl. No.: 10/449,169

(22) Filed: May 30, 2003

(65) Prior Publication Data

US 2004/0243874 A1 Dec. 2, 2004

(51) Int. Cl.
*G06F 1/04* (2006.01)
(52) U.S. Cl. ............... 713/500; 713/502; 713/400
(58) Field of Classification Search ............... 713/400, 713/500, 600, 502; 710/100
See application file for complete search history.

(56) References Cited

U.S. PATENT DOCUMENTS

| | | | | |
|---|---|---|---|---|
| 5,241,541 A | * | 8/1993 | Farrell et al. ............... | 370/438 |
| 5,852,728 A | | 12/1998 | Matsuda et al. | |
| 5,877,656 A | * | 3/1999 | Mann et al. ................... | 331/16 |
| 6,105,088 A | * | 8/2000 | Pascale et al. ............... | 710/100 |
| 6,282,210 B1 | | 8/2001 | Rapport et al. | |
| 6,349,391 B1 | | 2/2002 | Petivan et al. | |
| 6,377,575 B1 | * | 4/2002 | Mullaney et al. ............ | 370/360 |
| 6,577,095 B1 | * | 6/2003 | Firehammer ................. | 318/727 |

FOREIGN PATENT DOCUMENTS

EP          1 202 151          5/2002

OTHER PUBLICATIONS

PICMG; Advanced TCA, PCMG 3.0, Short Form Specification; http://www.picmg.org/aboutus.stm; Mar. 20, 2003; 38 pgs.; PICMG, c/o Virtual, Inc., 401 Edgewater Place, Suite 600, Wakefield, MA 01880 USA.
Cypress Semiconductor Coproration; CY7B9950 Final Datasheet; http://www.cypress.com/products/datasheet.cfm?partnum=CY7B9950; Mar. 20, 2003; 2 pgs.;Cypress Headquarters, 198 Champion Ct., San Jose, CA 95134 USA.
Texas Instruments Company; Texas Instruments Incorporated; http://www.ti.com/corp/docs/company/index.htm; Mar. 20, 2003; 26 pgs.; Company Headquarters Texas, Instruments Incorporation, 12500 USA.

* cited by examiner

*Primary Examiner*—Thomas Lee
*Assistant Examiner*—Hari Patel

(57) ABSTRACT

One or more programmable clock management components of an apparatus in one example are coupled with a backplane. The one or more programmable clock management components comprise a reconfigurable clock management component. Upon receipt of one or more control signals, the reconfigurable clock management component undergoes a reconfiguration to be able to process one or more frequency signals.

20 Claims, 2 Drawing Sheets

PROGRAMMABLE CLOCK MANAGEMENT COMPONENT RECONFIGURATION UPON RECEIPT OF ONE OR MORE CONTROL SIGNALS TO BE ABLE TO PROCESS ONE OR MORE FREQUENCY SIGNALS

TECHNICAL FIELD

The invention relates generally to computer-based systems and more particularly to clock synchronization.

BACKGROUND

Backplane based computer systems comprise one or more circuit boards plugged into one or more sockets of a backplane. The computer system in one example comprises a telecommunication system server. The backplane communicatively couples the circuit boards. The circuit boards comprise one or more clocks. The clocks in one example run more efficiently when synchronized. For example, a frequency signal travels from one of the circuit boards to one or more of the other circuit boards through a signal path in the backplane. The circuit boards employ the frequency signal to maintain clock synchronization of the clocks. Communication errors may result if the circuit boards fail to maintain the clock synchronization.

Clock signals require a redundancy to increase fault tolerance. For example, if a single clock signal source or distribution signal fails, the remainder of the system must continue to function with redundant clock signal sources and distribution signals. The clock source in one example is simplex. As one shortcoming, a single failure in the clock source can disable the entire system.

A first circuit board in one example comprises a clock signal source. The clock signal source generates the frequency signal. The clock source in one example comprises an Ethernet connection, a T1 connection, or a precision oscillator. The first circuit board sends the frequency signal to the signal path of the backplane. The frequency signal comprises a fixed signal on the signal path of the backplane. For example, the signal path always carries the frequency signal from the clock signal source to synchronize the clocks of the other circuit boards. As one shortcoming, the signal path always carries the frequency signal from the same clock signal source.

The clock signal source in one example is coupled to a processor component. The processor component modifies the frequency signal from the clock signal source. For example, the processor component scales the frequency signal by a factor before the circuit board sends the frequency signal to the signal path of the backplane. The clock signal source in one example is hard wired to the processor component. As one shortcoming, the clock signal source always sends the frequency signal to the same processor component.

Thus, a need exists for an increased ability to handle frequency signals from any of a plurality of clock signal sources. A further need exists for an increased ability to handle a plurality of processor components.

SUMMARY

The invention in one embodiment encompasses an apparatus. The apparatus comprises one or more programmable clock management components coupled with a backplane. The one or more programmable clock management components comprise a reconfigurable clock management component. Upon receipt of one or more control signals, the reconfigurable clock management component undergoes a reconfiguration to be able to process one or more frequency signals.

Another embodiment of the invention encompasses a method. One or more programmable clock management components are reconfigured upon receipt of one or more control signals to enable the one or more programmable clock management components to process one or more frequency signals. The one or more frequency signals are sent through a backplane to one or more signal sinks. One or more clocks of the one or more signal sinks are synchronized with one or more of the one or more frequency signals.

Yet another embodiment of the invention encompasses an article. The article comprises one or more computer-readable signal-bearing media. The article comprises means in the one or more media for reconfiguring one or more programmable clock management components upon receipt of one or more control signals to enable the one or more programmable clock management components to process one or more frequency signals. The article comprises means in the one or more media for sending the one or more frequency signals through a backplane to one or more signal sinks. The article comprises means in the one or more media for synchronizing one or more clocks of the one or more signal sinks with one or more of the one or more frequency signals.

DESCRIPTION OF THE DRAWINGS

Features of exemplary implementations of the invention will become apparent from the description, the claims, and the accompanying drawings in which:

DETAILED DESCRIPTION

Figure 1:
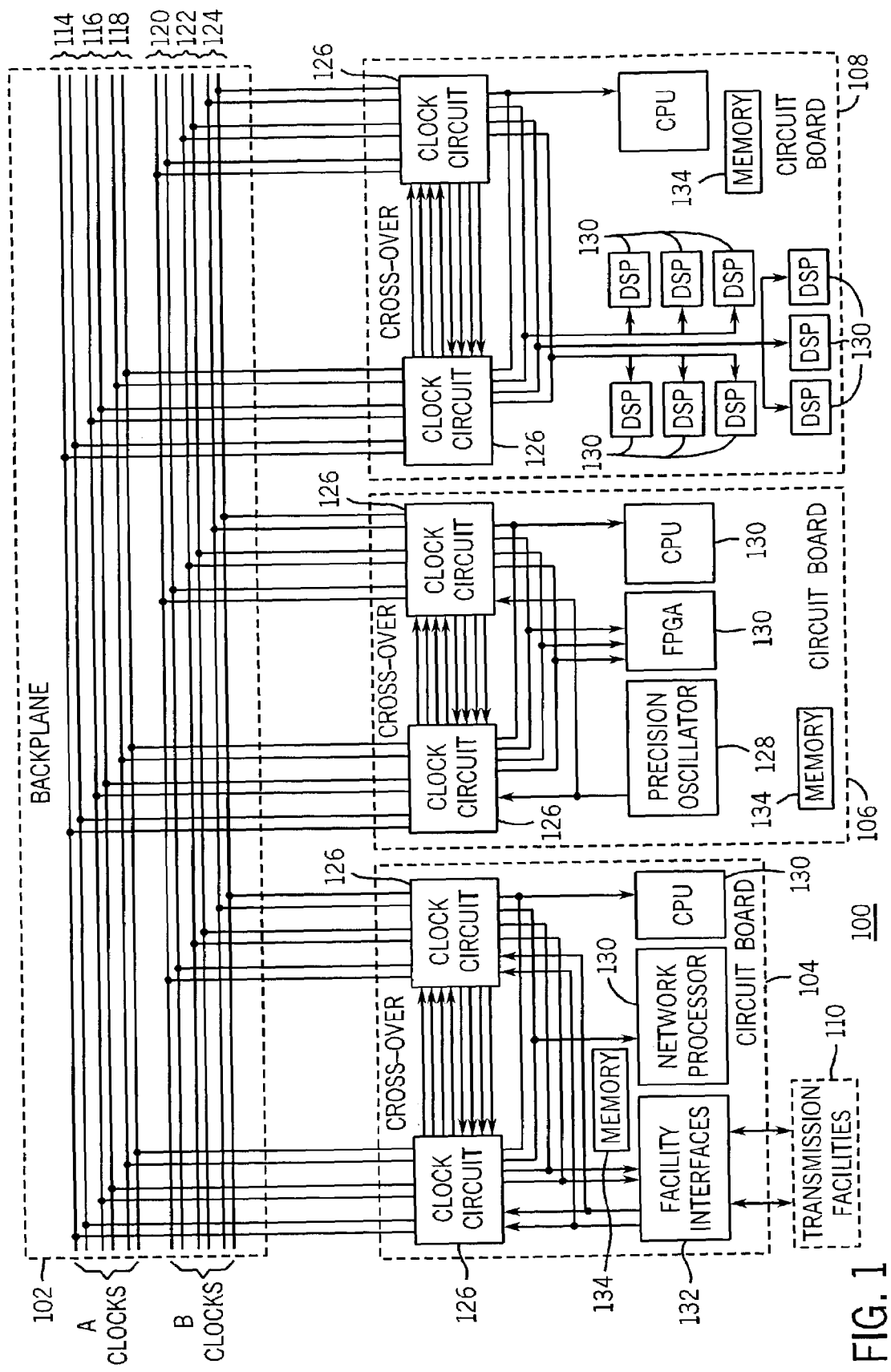
FIG. 1 is a representation of an exemplary implementation of an apparatus that comprises one or more backplanes, one or more circuit boards, and one or more signal sources and/or signal sinks, for example, one or more external transmission facilities.

Turning to FIG. 1, an apparatus 100 in one example comprises a set of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more backplanes 102, one or more circuit boards 104, 106, 108, and one or more signal sources and/or signal sinks, for example, one or more external transmission facilities 110.

The backplane 102 in one example comprises one or more signal paths 114, 116, 118, 120, 122, and 124 and one or more sockets. The backplane comprises an interface between the circuit boards 104, 106, and 108. For example, the signal paths 114, 116, 118, 120, 122, and 124 communicatively couple the backplane 102 and the circuit boards 104, 106, and 108. The circuit boards 104, 106, and 108 plug into the sockets of the backplane 102. The backplane 102 in one example comprises a shelf level bus topology for Advanced Telecom Compute Architecture ("ACTA" or PICMG 3.0).

The one or more signal paths 114, 116, and 118 comprise a first set of frequency signals and the one or more signals paths 120, 122, and 124 comprise a second set of frequency signals. In one example, the first set of frequency signals and the second set of frequency signals are different. In another example, the first set of frequency signals and the second set of frequency signals are substantially similar. In yet another example, the first set of frequency signals and the second set of frequency signals comprise copies of an identical group of signals. The signal paths 114, 116, 118, 120, 122, and 124 in one example carry one or more differential frequency signals. For example, the differential frequency signal of signal path 114 comprises a voltage difference between two differential signal paths of the signal path 114. The voltage difference comprises a differential link of a clock signal.

The circuit boards 104, 106, and 108 in one example comprise one or more of programmable clock management components 126, signal sources 128, signal sinks 130, and facility interfaces 132. The circuit boards 104, 106, and 108 in one example comprise an instance of a recordable data storage medium 134, as described herein. One or more of the signal paths 114, 116, 118, 120, 122, and 124 carry a signal that serves to synchronize one or more of the signal sources 128, the signal sinks 130, and the facility interfaces 132. For example, the signal paths 114, 116, 118, 120, 122, and 124 carry one or more frequency signals. The frequency signal on the signal path 114 in one example comprises a clock frequency. For example, one or more of the circuit boards 104, 106, and 108 employ the clock frequency to synchronize the signal sinks 130 and the facility interfaces 132 with one or more of the signal sources 128 and the external transmission facilities 110. The one or more circuit boards 104, 106, and 108 receive the one or more frequency signals from the one or more signal paths 114, 116, 118, 120, 122, and 124.

The external transmission facilities 110 in one example sends one or more frequency signals to the facility interfaces 132 of the circuit board 104. The circuit board 104 sends the one or more frequency signals through the one or more signal paths 114, 116, 118, 120, 122, and 124 over the backplane 102 to one or more of the circuit boards 104, 106, and 108. In another example, the circuit board 106 sends the one or more frequency signals from the signal source 128 through the one or more signal paths 114, 116, 118, 120, 122, and 124 over the backplane 102 to one or more of the circuit boards 104, 106, and 108. For example, the one or more of the circuit boards 104, 106, and/or 108 receive the one or more frequency signals through the one or more signal paths 114, 116, 118, 120, 122, and 124 from the backplane 102. Where the circuit board 104 in one example receives the one or more frequency signals, the circuit board 104 may send the frequency signals to the external transmission facilities 110. For example, the one or more frequency signals synchronize the transmission facilities 110 with the signal source 128.

The circuit board 104 in one example comprises one or more of the programmable clock management components 126, one or more of the signal sinks 130, and one or more of the facility interfaces 132. The circuit board 106 in one example comprises one or more of the programmable clock management components 126, one or more of the signal sources 128, and one or more of the signal sinks 130. The circuit board 108 in one example comprises one or more of the programmable clock management components 126 and one or more of the signal sinks 130.

The programmable clock management components 126 communicate one or more frequency signals between the backplane 102, the signal sources 128, the signal sinks 130, and facility interfaces 132. For example, the programmable clock management components 126 serve to synchronize one or more of the signal sources 128, the signal sinks 130, and the facility interfaces 132 with the one or more frequency signals. The programmable clock management components 126 modify and/or route the one or more frequency signals between the backplane 102, the signal sources 128, the signal sinks 130, and/or the facility interfaces 132.

In one example, the facility interfaces 132 send one or more frequency signals to the programmable clock management components 126 of the circuit board 104. The programmable clock management components 126 of the circuit board 104 send the one or more frequency signals through one or more of the signal paths 114, 116, 118, 120, 122, and 124 over the backplane 102 to the programmable clock management components 126 of one or more of the circuit boards 104, 106, and 108. The programmable clock management components 126 of the one or more of the circuit boards 104, 106, and 108 send the one or more frequency signals to one or more of the signal sinks 130 of the one or more of the circuit boards 104, 106, and 108.

In another example, the signal source 128 sends the one or more frequency signals to the programmable clock management components 126 of the circuit board 106. The programmable clock management components 126 of the circuit board 106 send the one or more frequency signals through one or more of the signal paths 114, 116, 118, 120, 122, and 124 over the backplane 102 to the programmable clock management components 126 of one or more of the circuit boards 104, 106, and 108. The programmable clock management components 126 of the one or more of the circuit boards 104, 106, and 108 send the one or more frequency signals to one or more of the signal sinks 130 of the one or more of the circuit board 104, 106, and 108.

Figure 2:
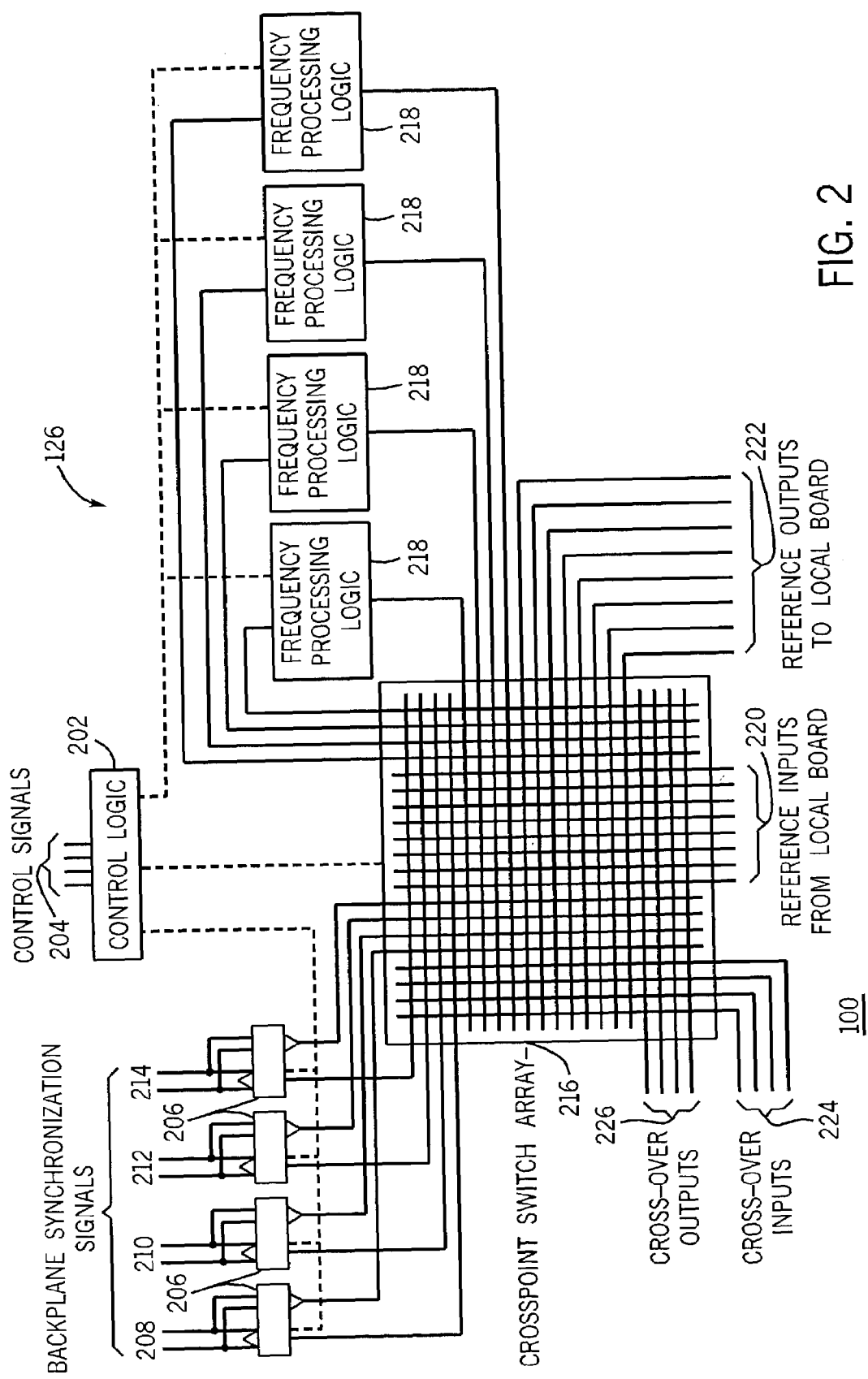
FIG. 2 is a representation of an exemplary implementation of the apparatus that comprises one or more control components, one or more signal paths, one or more transceivers, one or more switch components, and one or more processor components.

Referring to FIGS. 1 and 2, the programmable clock management components 126 comprise one or more control components 202, one or more signal paths 208, 210, 212, 214, one or more transceivers 206, one or more switch components 216, and one or more processor components 218. The signal sources 128 and the facility interfaces 132 in one example send one or more frequency signals to the programmable clock management components 126 through one or more reference inputs 220. The programmable clock management components 126 send one or more frequency signals to the signal sinks 130 and the facility interfaces 132 through one or more reference outputs 222. A first clock component of the programmable clock management components 126 and a second redundant clock component of the programmable clock management components 126 communicate frequency signals through one or more cross-over inputs 224 and one or more cross-over outputs 226. One or more computer terminals in one example employ one or more control signals 204 to control the control component 202. . For example, the one or more control signals 204 may reconfigure the programmable clock management components 126.

The control components 202 employ one or more commands to control one or more of the transceivers 206, the switch component 216, and/or the processor components 218. For example the control components 202 employ software, programmable logic, and/or bit registers to affect actions of the transceivers 206, the switch component 216, and/or the processor components 218.

A synchronization infrastructure of the programmable clock management components 126 in one example comprises a reconfigurable clock management component. As faults occur, new capabilities are added, or transmission facility rates change, the reconfiguration of the programmable clock management components 126 may promote continued function of the programmable clock management components 126. For example, a computer terminal employs the control signals 204 to reprogram the control components 202 of the programmable clock management components 126. In one example, the signal paths 114, 116, and 118 fail and the reconfigurable nature of the programmable clock management components 126 allow the system to recover from the failure. In another example, the facility interfaces 132 support a transmission facility rate that comprises a 1.544 MHz T1 standard. If the transmission facility rate changes to support a 622.08 MHz OC-12 standard, the processor components 218 employ commands from the control components 202 to change division factors. For example, the programmable clock management components 126 can accept the new frequency without hardware modifications. In yet another example, as the frequency needs of the signal sinks 130 change in response to faster semiconductor technologies, the reconfigurable nature of the programmable clock management components 126 can support the faster semiconductors.

The one or more signal paths 208, 210, 212, and 214 carry one or more frequency signals to and/or from the signal paths 114, 116, 118, 120, 122, and 124 of the backplane 102. For example, the one or more signal paths 208, 210, 212, and 214 carry the one or more frequency signals to and/or from the one or more signal sources 128, the one or more signal sinks 130, and the one or more facility interfaces 132. The signal path 214 in one example comprises a duplicate of one of the signal paths 208, 210, or 212. For example, the signal path 214 exists for fault tolerance. In one example, the one or more signal paths 114, 116, and 118 carry the same frequency signals as the one or more signal paths 208, 210, and 212. In another example, the one or more signal paths 120, 122, and 124 carry the same frequency signals as the one or more signal paths 208, 210, and 212. The signal paths 208, 210, 212, and 214 in one example carry one or more differential frequency signals. For example, the differential frequency signal of signal path 208 comprises a voltage difference between two differential signal paths of the signal path 208. The voltage difference comprises a differential link of a clock signal.

The transceivers 206 communicate one or more frequency signals between the backplane 102 and the switch component 216 through the one or more signal paths 208, 210, 212, and 214. In one example, where the transceivers 206 receive frequency signals from the backplane, the transceivers 206 perform differential to single ended conversion. In another example, where the transceivers 206 transmit frequency signals to the backplane, the transceivers 206 perform single ended to differential conversion. The transceivers 206 in one example translate between one or more voltage levels and impedances required for the frequency signals of the signal paths 208, 210, 212, and 214 to one or more voltage levels and impedances required by switch component 216.

The control component 202 sends commands to control the transceivers 206. The transceivers 206 employ the commands to enable the transceivers 206 to send and/or receive the frequency signals through the one or more signal paths 208, 210, 212, and 214. The transceiver 206 in one example receives a first frequency signal from the switch component 216. The transceiver 206 may then send the first frequency signal to the backplane 102 through the signal path 208. The transceiver 206 in one example receives a second frequency signal from the backplane 102 through the signal path 210. The transceiver may then send the second frequency signal to the switch component 216.

The switch component 216 routes one or more frequency signals between the signal sources 128, the signal sinks 130, the facility interfaces 132, the processor components 218, and the transceivers 206. For example, the switch component 216 comprises a gated cross-point switch array for routing signals. The control component 202 sends commands to control the switch component 216. The switch component 216 employs the commands to route the one or more frequency signals to one or more signal destinations. For example, the signal destinations comprise the backplane 102, the signal sinks 130, the facility interface 128, the transceivers 206, the processors 218, the reference outputs 222, and/or the cross-over outputs 226.

In a first example, the switch component 216 receives a first frequency signal from the reference input 220 and routes the first frequency signal to the signal path 208. In a second example, the switch component 216 receives a second frequency signal from the reference input 220 and routes the second frequency signal to the signal paths 208 and 210. In a third example, the switch component 216 receives a frequency signal from the signal path 208 and routes the frequency signal to one or more of the reference outputs 222.

The processor components 218 in one example modify the one or more frequency signals. For example, the processor components 218 comprise bit registers that employ software logic. In one example, the processor components 218 comprise phase locked loops ("PLLs"), delay locked loops ("DLLs"), and/or jitter control devices. For example, the processor components 218 can modify the one or more signals 208, 210, 212, and 214 through multiplication, division, jitter reduction, and/or phase shift. The control component 202 sends commands to control the processor components 218. The processor components 218 employ the commands to modify the one or more frequency signals. For example, the processor components 218 receive the one or more frequency signals from the switch component 216. The processor components 218 modify the one or more frequency signals and then send the one or more frequency signals back to the switch component 216 after the modification. The one or more processor components 218 in one example permit the programmable clock management component 126 to process many frequency signals simultaneously.

The reference inputs 220 communicate one or more frequency signals between the switch component 216, the signal sources 128, and/or the facility interfaces 132. The reference inputs 220 in one example receive the one or more frequency signals from the signal sources 128. In another example, the reference inputs 220 receive one or more frequency signals from the facility interfaces 132. The reference inputs 220 carry the one or more frequency signals to the switch component 216.

The reference outputs 222 communicate one or more frequency signals between the switch components 216, the signal sinks 130, and/or the facility interfaces 132. For example, the reference outputs 222 receive the one or more frequency signals from the switch component 216. The reference outputs 222 in one example send the one or more frequency signals to set one or more clocks of the signal sinks 130. The reference outputs 222 in another example send the one or more frequency signals to set one or more clocks of the facility interfaces 132.

The cross-over outputs 226 communicate one or more frequency signals between the switch component 216 of a first programmable clock management component of the programmable clock management components 126 and the cross-over inputs 224 of a second programmable clock management component of the programmable clock management components 126. For example, the first programmable clock management component and the second programmable clock management component are located on the circuit board 104. In one example, the first programmable clock management component sends the frequency signals to the second programmable clock management component.

The first programmable clock management component and the second programmable clock management component comprise a fault tolerance strategy. For example, upon failure of the first programmable clock management component, the second programmable clock management component 126 will perform the responsibilities of the first programmable clock management component and communicate the one or more frequency signals between the backplane 102, the signal sources 128, the signal sinks 130, and/or the facility interfaces 132. Advantageously, the first programmable clock management component 126 and the second programmable clock management component 126 insure that a failure of one of the programmable clock management components will not duplex fail the entire system. For example, the signal paths 114, 116, and 118 and the signal paths 120, 122, and 124 will not simultaneously disable.

The signal sources 128 communicate with the reference inputs 220 of the programmable clock management components 126. The signal sources 128 of the one or more circuit boards 104, 106, and 108 in one example send one or more frequency signals that serve to synchronize the clocks of the signal sources 128, the signal sinks 130 and/or the facility interfaces 132 of the one or more circuit boards 104, 106, and 108. For example, the signal sources 128 send frequency signals to the reference inputs 220 of the programmable clock management components 126. The signal source 128 in one example comprises one or more of an oscillator, an atomic frequency reference, and a clock recovery unit.

The signal sinks 130 communicate with the reference outputs 222 of the programmable clock management components 126. The signal sinks 130 of the one or more circuit boards 104, 106, and 108 in one example receive one or more frequency signals that serve to synchronize the signal sources, the signal sinks 130 and/or the facility interfaces 132 of the one or more circuit boards 104, 106, and 108. For example the signal sinks 130 receive frequency signals from the reference outputs 222 of the programmable clock management components 126. The signal sinks 130 in one example comprise one or more of a network processor, a central processing unit ("CPU"), a field programmable array ("FPGA"), and a digital signal processor ("DSP").

The facility interfaces 132 communicate with the external transmission facilities 110 and the programmable clock management components 126. The facility interfaces 132 in one example employs one or more frequency signals to synchronize the external transmission facilities 110, the facility interfaces 132, the signal sources 128, and the signal sinks 130 of the one or more circuit boards 104, 106, and 108. The facility interfaces 132 in one example perform a clock recovery operation on the external transmission facilities 110. For example, the external transmission facilities 110 send one or more transmission signals to the facility interfaces 132. The facility interfaces 132 send one or more frequency signals to the reference inputs 220 of the programmable clock management component 126. In another example, the reference outputs 222 of the programmable clock management components 126 send one or more frequency signals to the facility interfaces 132. The facility interfaces 132 employ the one or more frequency signals to derive proper timing for the transmission signals of the external transmission facilities 110. For example, the external transmission facilities 110 employs the transmission signals to synchronize one or more clocks.

The external transmission facilities 110 communicate with the facility interfaces 132. The external transmission facilities 110 employ one or more frequency signals to synchronize the external transmission facilities 110, the facility interfaces 132, the signal sources 128, and the signal sinks 130 of the one or more circuit boards 104, 106, and 108. In one example, the external transmission facilities 110 send one or more reference frequency signals to the facility interfaces 132. In another example, the external transmission facilities 110 receive, one or more frequency signals from the facility interfaces 132.

In one example, the external transmission facilities 110 comprise one or more clock sources. In another example, the external transmission facilities 110 comprise one or more clock sinks. In yet another example, the external transmission facilities 110 comprise one or more clock sources and one or more clock sinks. The external transmission facilities 110 in one example comprise digital data transport facilities such as a DS3, a T1 digital communication system, a synchronous optical network ("SONET"), and/or a global positioning system ("GPS") signal.

An illustrative description of exemplary operation of the apparatus 100 now is presented, for explanatory purposes. The external transmission facilities 110 send one or more frequency signals to the circuit board 104. The one or more frequency signals synchronize one or more of the facility interfaces 132 and the signal sinks 130 of one or more of the circuit boards 104, 106, 108 with the external transmission facilities 110. The external transmission facilities 110 in one example send one or more frequency signals to the facility interface 132 of the circuit board 104. For example, the facility interface 132 sends the one or more frequency signals to one or more of the programmable clock management components 126 of the circuit board 104.

The facility interfaces 132 in one example perform a clock recovery operation from the transmission facilities 110. For example, the transmission facilities 110 send one or more reference frequencies to the facility interfaces 132. The facility interfaces 132 send a first frequency signal and a second frequency signal to a first one of the programmable clock management components 126 of the circuit board 104. For example, the facility interfaces 132 send the first frequency signal and the second frequency signal to one or more of the reference inputs 220. The one or more reference inputs 220 carry the first frequency signal and the second frequency signal to the switch component 216.

The computer terminal sends one or more control signals 204 to the one or more control components 202. In one example, the control component 202 sends one or more commands to the switch component 216 to route the first frequency signal through the switch component 216. For example, the switch component 216 sends the first frequency signal to one or more of the processor components 218. The control component 202 sends one or more commands to control the one or more processor components 218. For example, the switch component 216 carries the first frequency signal to a first one of the processor components 218. The first processor component 218 in one example multiplies the first frequency signal by a number. The switch component 216 carries the first frequency signal to a second one of the processor components 218. The second processor component 218 in one example divides the first frequency signal by a number.

In a further example, the control component 202 sends one or more commands to route the second frequency signal through the switch component 216. For example, the switch component 216 sends the second frequency signal to one or more of the processor components 218. The control component 202 sends one or more commands to control the one or more processor components 218. For example, the switch component 216 sends the second frequency signal to a third one or the processor component 218. The third processor component 218 in one example reduces jitter of the second frequency signal.

The one or more processor components 218 in one example send one or more frequency signals to the switch component 216. For example, the one or more frequency signals are modified versions of the original frequency signals. The control component 202 sends one or more commands to route the one or more frequency signals through the switch component 216. For example, the switch component routes the one or more frequency signals to one or more of the cross-over outputs 226. The cross-over outputs 226 send the one or more frequency signals to one or more of the cross-over inputs 224 of a second programmable clock management component of the programmable clock management components 126 of the circuit board 104. The switch components 216 of the first programmable clock management component 126 and the second programmable clock management component 126 send one or more of the one or more frequency signals to one or more of the transceivers 206. The control components 202 send one or more commands to enable the one or more of the transceivers 206 to send the one or more of the one or more frequency signals to the backplane 102.

One or more of the signal paths 208, 210, 212, and 214 in one example carry the one or more of the one or more frequency signals to the backplane 102. For example, the one or more of the one or more frequency signals set a first, second, and third frequency signal at the backplane 102. The frequency signals of the backplane 102 in one example comprise multiplied, divided or jitter reduced frequencies in synchronization with the reference frequencies from the transmission facilities 110. The signal paths 114, 116, 118, 120, 122, and 124 carry the frequency signals from the one or more programmable clock management components 126 of the circuit board 104 to one or more of the programmable clock management components 126 of the circuit boards 104, 106, and/or 108.

The circuit board 106 in one example receives one or more of the frequency signals from the backplane 102. For example, a first frequency signal of the signal paths 114 and 120 travels to a first programmable clock management component and a second programmable clock management component of the programmable clock management components 126 of the circuit board 106 on the signal paths 208. A second frequency signal of the signal paths 116 and 122 travels to the second programmable clock management component 126 on the signal path 210. The computer terminal sends one or more control signals 204 to the one or more control components 202. The control component 202 sends one or more commands to enable one or more of the transceivers 206 to receive the first frequency signal and the second frequency signal. The transceivers 206 send the first frequency signal and the second frequency signal to the switch component 216. The control component 202 in one example sends one or more commands to route the first frequency signal and the second frequency signal through the switch component 216.

The switch component 216 in one example sends the first frequency signal to one or more of the processor components 218. The control component 202 sends one or more commands to control the one or more processor components 218. For example, the switch component 216 sends the first frequency signal to a first processor component of the processor components 218. The first processor component 218 in one example alters the phase of the first frequency signal. The first processor component 218 sends the phase altered version of the first frequency signal to the switch component 216. The second frequency signal bypasses the other processor components of the processor components 218.

The control component 202 in one example sends one or more commands to route the first frequency signal and the second frequency signal through the switch component 216. For example, the switch component 216 routes one or more of the first frequency signal and the second frequency signal to one or more of the cross-over outputs 226. The cross-over outputs 226 send one or more of the first frequency signal and the second frequency signal to one or more of the cross-over inputs 224 of a second programmable clock management component of the programmable clock management components 126 of the circuit board 106. The switch component 216 routes one or more of the first frequency signal and the second frequency signal to one or more of the reference outputs 222. For example, one or more of the signal sinks 130 of the circuit board 106 receive one or more of the first frequency signal and the second frequency signal from one or more of the programmable clock management components 126. The one or more signal sinks 130 employ the frequency signals to synchronize one or more clocks of the one or more signal sinks 130 with one or more clocks of the external transmission facilities 110 and the facility interfaces 132 of the circuit board 104.

The circuit board 108 in one example receives one or more of the frequency signals from the backplane 102. For example, the frequency signal of the signal path 120 travels to the programmable clock management component 126 of the circuit board 108 on the signal path 208. The computer terminal sends one or more control signals 204 to the one or more control components 202. The control component 202 sends one or more commands to enable one or more of the transceivers 206 to receive the frequency signal. The transceiver 206 sends the frequency signal to the switch component 216.

The control component 202 in one example sends one or more commands to route the frequency signal through the switch component 216. For example, the switch component 216 routes the frequency signal to one or more of the cross-over outputs 226. The cross-over outputs 226 send the frequency signal to one or more of the cross-over inputs 224 of a second programmable clock management component of the programmable clock management components 126 of the circuit board 108. The switch component 216 sends the frequency signal to one or more of the processor components 218. The control component 202 sends one or more commands to control the one or more processor components 218. For example, the switch component 216 sends the frequency signal to a first processor component of the processor components 218. The first processor component 218 in one example multiplies the frequency signal by a number. The switch component 216 sends the frequency signal to a second processor component of the processor components 218. The second processor component 218 in one example reduces jitter of the frequency signal.

The processor components 218 in one example send one or more frequency signals to the switch component. For example, the one or more frequency signals are modified versions of the original frequency signals. The control component 202 sends one or more commands to route the one or more frequency signals through the switch component 216. For example, the switch component 216 sends one or more of the frequency signals to one or more of the reference outputs 222. The reference outputs 222 carry the one or more of the frequency signals to the signal sinks 130 of the circuit board 108. The one or more signal sinks 130 employ the frequency signals to synchronize one or more clocks of the one or more signal sinks 130 with one or more clocks of the external transmission facilities 110 and the facility interfaces 132 of the circuit board 104.

The signal source 128 of the circuit board 106 in one example sends one or more frequency signals to replace the frequency signals at the backplane 102 and/or to synchronize one or more of the external clocks, the facility interfaces, and the signal sinks of the circuit boards 104, 106, and 108. For example, the signal source 128 sends a frequency signal to the programmable clock management component 126 of the circuit board 106.

One or more of the programmable clock management components 126 in one example receive the frequency signal from the signal source 128. The signal source 128 sends the frequency signal to a reference input of the one or more reference inputs 220. The reference input 220 sends the frequency signal to the switch component 216.

The computer terminal sends one or more control signals 204 to the one or more control components 202. In one example, the control component 202 sends one or more commands to route the frequency signal through the switch component 216. For example, the switch component 216 routes the frequency signal to one or more of the cross-over outputs 226. The cross-over outputs 226 send the frequency signal to one or more of the cross-over inputs 224 of a second programmable clock management component of the programmable clock management components 126 of the circuit board 108. The switch component 216 sends the frequency signal to one or more of the processor components 218. The control component 202 sends one or more commands to control the one or more processor components 218. For example, the switch component 216 sends the frequency signal to a first processor component of the processor components 218. The first processor component 218 in one example alters the phase of the frequency signal. The switch component 216 sends the frequency signal to a second processor component 218 of the processor components. The second processor component 218 in one example divides the frequency signal by a number.

The one or more processor components 218 in one example send one or more frequency signals to the switch component 216. For example, the one or more frequency signals are modified versions of the original frequency signals. The control component 202 sends one or more commands to route the one or more frequency signals through the switch component 216. For example, the switch component 216 sends one or more of the one or more frequency signals to one or more of the transceivers 206. The control component 202 sends one or more commands to enable the one or more of the transceivers 206 to send the one or more of the one or more frequency signals to the backplane 102.

One or more of the signal paths 208, 210, 212, and 214 in one example carry the one or more of the one or more frequency signals to the backplane 102. For example, a first frequency signal replaces the frequency signal of the signal paths 114 and 120 at the backplane 102. A second frequency signal replaces the frequency signal of the signal paths 116 and 122.

The circuit board 104 in one example receives one or more of the frequency signals from the backplane 102. For example, the frequency signals of the signal paths 114 travel to one or more of the programmable clock management components 126 of the circuit board 104 on the signal paths 208. The computer terminal sends one or more control signals 204 to the one or more control components 202. The control component 202 sends one or more commands to enable one or more of the transceivers 206 to receive the frequency signal. The transceiver 206 sends the frequency signal to the switch component 216. The control component 202 in one example sends one or more commands to route the frequency signal through the switch component 216.

The switch component 216 in one example routes the frequency signal to one or more of the reference outputs 222. For example, the frequency signal bypasses the processor components 218. One or more of the programmable clock management components 126 send one or more of the frequency signals to one or more of the signal sinks 130 and the facility interface 132 of the circuit board 104. The facility interface 132 sends one or more of the frequency signals to the external transmission facilities 110. One or more of the signal sinks 130, facility interface 132, and external transmission facilities 110 employ the frequency signals to synchronize one or more clocks of the one or more of the signal sinks 130, facility interface 132, and external transmission facilities 110 with one or more clocks of the signal source 128 of the circuit board 106.

The apparatus 100 in one example employs one or more computer-readable signal-bearing media. Examples of a computer-readable signal-bearing medium for the apparatus 100 comprise the recordable data storage medium 134 of the circuit boards 104, 106, and 108. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   one or more programmable clock management components coupled with a backplane, wherein the one or more programmable clock management components comprise a) reconfigurable clock management component and b) a switch component having a gated crosspoint switch array;
   wherein upon receipt of one or more control signals, the reconfigurable clock management component undergoes a reconfiguration to be able to process one or more frequency signals.

2. The apparatus of claim 1, wherein the reconfigurable clock management component sets the one or more frequency signals at the backplane.

3. The apparatus of claim 2, wherein the one or more programmable clock management components comprise a first reconfigurable clock management component, and wherein the one or more programmable clock management components comprise a second reconfigurable clock management component;
   wherein the second reconfigurable clock management component receives one or more of the one or more frequency signals from the backplane, and wherein the second reconfigurable clock management component sends the one or more of the one or more frequency signals to one or more signal sinks;
   wherein the one or more signal sinks comprise one or more clocks, and wherein the one or more signal sinks employ the one or more of the one or more frequency signals to synchronize one or more of the one or more clocks with the one or more of the one or more frequency signals.

4. The apparatus of claim 1, wherein the reconfigurable clock management component receives the one or more frequency signals from one or more signal sources.

5. The apparatus of claim 1,
   wherein the switch component routes one or more of the one or more frequency signals to one or more signal destinations.

6. The apparatus of claim 5, wherein the one or more programmable clock management components comprise one or more control components;
   wherein one or more of the one or more control components employ one or more of the one or more control signals to send one or more commands to the switch component, and wherein the switch component employs the one or more commands to route the one or more of the one or more frequency signals to the one or more signal destinations.

7. The apparatus of claim 1, wherein the one or more programmable clock management components comprise one or more processor components;
   wherein one or more of the one or more processor components make a modification to one or more of the one or more frequency signals before the reconfigurable clock management component sets the one or more frequency signals at the backplane.

8. The apparatus of claim 7, wherein the one or more programmable clock management components comprise one or more control components;
   wherein one or more of the one or more control components employ one or more of the one or more control signals to send one or more commands to one or more of the one or more processor components, and wherein the one or more of the one or more processor components employ one or more of the one or more commands to determine a type of the modification to make to the one or more of the one or more frequency signals.

9. The apparatus of claim 8, wherein the type of the modification comprises a multiplication of the one or more of the one or more frequency signals by a number, and wherein the one or more of the one or more processor components employ the multiplication to modify the one or more of the one of more frequency signals.

10. The apparatus of claim 8, wherein the type of the modification comprises a division of the one or more of the one or more frequency signals by a number, and wherein the one or more of the one or more processor components employ the division to modify the one or more of the one of more frequency signals.

11. The apparatus of claim 8, wherein the type of the modification comprises a jitter reduction of the one or more of the one or more frequency signals, and wherein the one or more of the one or more processor components employ the jitter reduction to modify the one or more of the one of more frequency signals.

12. The apparatus of claim 8, wherein the type of the modification comprises a phase shift of the one or more of the one or more frequency signals, and wherein the one or more of the one or more processor components employ the phase shift to modify the one or more of the one of more frequency signals.

13. The apparatus of claim 1, wherein the one or more programmable clock management components comprise one or more transceivers;
   wherein one or more of the one or more transceivers send one or more of the one or more frequency signals to the backplane;
   wherein one or more of the one or more transceivers receive one or more of the one or more frequency signals from the backplane.

14. The apparatus of claim 13, wherein the one or more programmable clock management components comprise one or more control components;
   wherein one or more of the one or more control components employ one or more of the one or more control signals to send one or more commands to the one or more of the one or more transceivers that send the one or more of the one or more frequency signals to the backplane;
   wherein the one or more commands enable the one or more of the one or more transceivers that send the one or more of the one or more frequency signals to the backplane to send the one or more of the one or more frequency signals to the backplane;
   wherein one or more of the one or more control components employ one or more of the one or more control signals to send one or more commands to the one or more of the one or more transceivers that receive the one or more of the one or more frequency signals from the backplane;
   wherein the one or more commands enable the one or more of the one or more transceivers that receive the one or more of the one or more frequency signals from the backplane to receive the one or more of the one or more frequency signals from the backplane.

15. The apparatus of claim 1, wherein the one or more programmable clock management components comprise a first reconfigurable clock management component, and wherein the one or more programmable clock management components comprise a second reconfigurable clock management component;

wherein the first reconfigurable clock management component sends the one or more frequency signal to the second reconfigurable clock management component;

wherein both the first reconfigurable clock management component and the second reconfigurable clock management component send the one or more frequency signals to the backplane.

16. The apparatus of claim 1, wherein the one or more programmable clock management components comprise a one or more processor components and one or more transceivers;

wherein the switch component routes the one or more frequency signals from a signal source to one or more of the one or more processor components;

wherein the one or more of the one or more processor components modify the one or more frequency signals to generate one or more modified versions of the one or more frequency signals;

wherein the one or more of the one or more processor components return the one or more modified versions of the one or more frequency signals to the switch component;

wherein the reconfigurable clock management component employs the one or more transceivers to send the one or more modified versions of the one or more frequency signals to the backplane to set the one or more modified versions of the one or more frequency signals at the backplane.

17. The apparatus of claim 16, wherein the one or more programmable clock management components comprise a first reconfigurable clock management component, and wherein the one or more programmable clock management components comprise a second reconfigurable clock management component;

wherein the second reconfigurable clock management component comprises a switch component, one or more processor components, and one or more transceivers;

wherein the second reconfigurable clock management component employs one or more of the one or more transceivers of the second reconfigurable clock management component to receive the one or more modified versions of the one or more frequency signals from the backplane;

wherein the switch component of the second reconfigurable clock management component routes the one or more modified versions of the one or more frequency signals from the one or more of the one or more transceivers of the second reconfigurable clock management component to the one or more processor components of the second reconfigurable clock management component;

wherein one or more of the one or more processor components of the second reconfigurable clock management component return one or more modified versions of the one or more modified versions of the one or more frequency signals to the switch component of the second reconfigurable clock management component;

wherein the switch component of the second reconfigurable clock management component routes the one or more modified versions of the one or more modified versions of the one or more frequency signals to one or more signal sinks;

wherein the one or more signal sinks employ the one or more modified versions of the one or more modified versions of the one or more frequency signals to synchronize one or more clocks of the one or more signal sinks.

18. A method, comprising the steps of:

reconfiguring one or more programmable clock management components upon receipt of one or more control signals to enable the one or more programmable clock management components to process one or more frequency signals;

sending the one or more frequency signals through a backplane to one or more signal sinks; and synchronizing one or more clocks of the one or more signal sinks with one or more of the one or more frequency signals, wherein the one or more programmable clock management components have a switch component having a gated cross-point switch array.

19. The method of claim 18, wherein the step of sending the one or more frequency signals through the backplane to the one or more signal sinks comprises the steps of:

routing the one or more frequency signals to one or more processor components of the one or more programmable clock management components;

modifying the one or more frequency signals at the one or more processor components to generate one or more modified versions of the one or more frequency signals; and routing the one or more modified versions to the one or more signal sinks.

20. An article, comprising:

one or more computer-readable signal-bearing media;

means in the one or more media for reconfiguring one or more programmable clock management components upon receipt of one or more control signals to enable the one or more programmable clock management components to process one or more frequency signals;

means in the one or more media for sending the one or more frequency signals through a backplane to one or more signal sinks; and means in the one or more media for synchronizing one or more clocks of the one or more signal sinks with one or more of the one or more frequency signals;

wherein the one or more programmable clock management components have a switch component having a gated cross-point switch array.

* * * * *